(12) United States Patent
Konita

(10) Patent No.: US 11,698,985 B2
(45) Date of Patent: Jul. 11, 2023

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Naoya Konita, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 69 days.

(21) Appl. No.: 17/168,194

(22) Filed: Feb. 5, 2021

(65) Prior Publication Data
US 2022/0019680 A1 Jan. 20, 2022

(30) Foreign Application Priority Data
Jul. 16, 2020 (JP) .................... 2020-121942

(51) Int. Cl.
*H04L 29/06* (2006.01)
*G06F 21/62* (2013.01)

(52) U.S. Cl.
CPC .................... *G06F 21/62* (2013.01)

(58) Field of Classification Search
CPC ......................................... G06F 21/62
See application file for complete search history.

(56) References Cited

U.S. PATENT DOCUMENTS

| | | | | |
|---|---|---|---|---|
| 2006/0278694 A1* | 12/2006 | Jha | ............ | G06F 21/54 235/379 |
| 2012/0151553 A1* | 6/2012 | Burgess | ............ | G06F 21/6218 726/1 |
| 2014/0279519 A1* | 9/2014 | Mattes | ............ | G06Q 20/12 705/44 |
| 2017/0171173 A1* | 6/2017 | Chandrasekaran | ............ | H04L 63/0884 |
| 2018/0025086 A1* | 1/2018 | Malkin | ............ | G06Q 30/02 707/710 |

FOREIGN PATENT DOCUMENTS

JP 2007280016 10/2007

* cited by examiner

*Primary Examiner* — Jason K Gee
(74) *Attorney, Agent, or Firm* — JCIPRNET

(57) ABSTRACT

An information processing apparatus includes a processor configured to receive a device ID for identifying a processing request transmission device and a processing request from the processing request transmission device, and specify a related user related to the processing request based on the device ID and then execute processing according to the processing request.

12 Claims, 5 Drawing Sheets

38

| USER ID | AUTHORITY INFORMATION | | | | | | | CONTACT INFORMATION |
|---|---|---|---|---|---|---|---|---|
| | PRINT AUTHORITY | | | TRAY AUTHORITY | | PROCESSABLE TIME ZONE | ... | |
| | COLOR PRINTING | SINGLE-SIDED PRINTING | ... | SPECIAL TRAY | ... | | | |
| U0001 | O | O | ... | O | ... | 8:00 TO 14:00 | ... | xxxxx |
| U0002 | X | O | ... | X | ... | 12:00 TO 17:00 | ... | xxxxx |
| U0003 | O | X | ... | O | ... | 14:00 TO 21:00 | ... | xxxxx |
| U0004 | X | X | ... | X | ... | 6:00 TO 21:00 | ... | xxxxx |
| ... | ... | ... | ... | ... | ... | ... | ... | ... |

| USER ID | AUTHORITY INFORMATION ||||||| CONTACT INFORMATION |
| | PRINT AUTHORITY ||| TRAY AUTHORITY || ... | PROCESSABLE TIME ZONE | ... | |
| | COLOR PRINTING | SINGLE-SIDED PRINTING | ... | SPECIAL TRAY | ... | | | | |
|---|---|---|---|---|---|---|---|---|---|
| U0001 | ○ | ○ | ... | ○ | ... | ... | 8:00 TO 14:00 | ... | xxxxx |
| U0002 | × | ○ | ... | × | ... | ... | 12:00 TO 17:00 | ... | xxxxx |
| U0003 | ○ | × | ... | ○ | ... | ... | 14:00 TO 21:00 | ... | xxxxx |
| U0004 | × | × | ... | × | ... | ... | 6:00 TO 21:00 | ... | xxxxx |
| ... | ... | ... | ... | ... | ... | ... | ... | ... | ... |

| DEVICE ID | USER ID | EXECUTION PERMISSION INFORMATION |
|---|---|---|
| D0001 | U0002 | O |
| D0002 | U0001 | O |
|  | U0004 | X |
| D0003 | U0002 | X |
|  | U1530 | O |
| D0004 | U0423 | X |
| ... | ... | ... |

FIG. 5

| CONFERENCE ROOM | DEVICE ID | CONFERENCE RESERVATION | |
|---|---|---|---|
|  |  | TIME ZONE | PARTICIPANT |
| Room1 | D0001 | 13:00 TO 14:00 | U0001 U0004 |
|  |  | ... | ... |
| Room2 | D0002 | 9:30 TO 10:30 | U0001 U0002 U0003 |
|  |  | ... | ... |
| Room3 | D0003 | - | - |
| ... | ... | ... | ... |

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2020-121942 filed Jul. 16, 2020.

BACKGROUND

(i) Technical Field

The present invention relates to an information processing apparatus and a non-transitory computer readable medium storing an information processing program.

(ii) Related Art

In the related art, an information processing apparatus that executes processing according to an input processing request is known. The information processing apparatus registers a user of the information processing apparatus in advance, specifies a user related to the input processing request, and executes processing according to the processing request. In a case where the user related to the processing request is specified, it is possible to refuse execution of the processing request from an unknown (unregistered) user or to execute processing (for example, processing of storing target data that is a target of the processing request in a storage area dedicated to the user registered in advance) according to the user (of course, an advantage of specifying the user related to the processing request is not limited thereto).

For example, JP2007-280016A discloses a conference support system including a multifunction device, and a projector that projects electronic information (video signal) input from the multifunction device. The conference support system limits output of the electronic information from the multifunction device to the projector in a case where a viewer who does not have access authority with respect to the electronic information is included in viewers of a projected image of the projector.

SUMMARY

In an information processing apparatus that specifies a user and then executes a processing request, a user ID, which identifies the user who is associated with the processing request and is related to the processing request, is generally input to the information processing apparatus. Further, the information processing apparatus generally specifies the user related to the input processing request based on the user ID.

However, there is a case where the processing request is input to the information processing apparatus while the user ID is not input. Specifically, in a case where the processing request is transmitted from a processing request transmission device (for example, a device on which an AI is mounted, but the processing request transmission device is not limited thereto) to the information processing apparatus, there is a case where the user ID of the user related to the processing request is not input to the information processing apparatus.

In a case where it is assumed that the processing request is input to the information processing apparatus from the processing request transmission device, it is considered to register the device ID for identifying the processing request transmission device in the information processing apparatus in advance. However, in authentication simply based on the device ID, the information processing apparatus can specify the processing request transmission device that transmits the processing request but does not specify the user related to the processing request.

Aspects of non-limiting embodiments of the present disclosure relate to an information processing apparatus and a non-transitory computer readable medium storing an information processing program, which specify a related user related to the processing request and execute a processing request in a case where the processing request is received from a processing request transmission device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive a device ID for identifying a processing request transmission device and a processing request from the processing request transmission device, and specify a related user related to the processing request based on the device ID and then execute processing according to the processing request.

BRIEF DESCRIPTION OF THE DRAWINGS

Exemplary embodiment(s) of the present invention will be described in detail based on the following figures, wherein:

FIG. 3 is a diagram showing an example of content of a user DB;

FIG. 4 is a diagram showing an example of content of ID-related information;

FIG. 5 is a diagram showing an example of content of schedule information.

DETAILED DESCRIPTION

Figure 1:
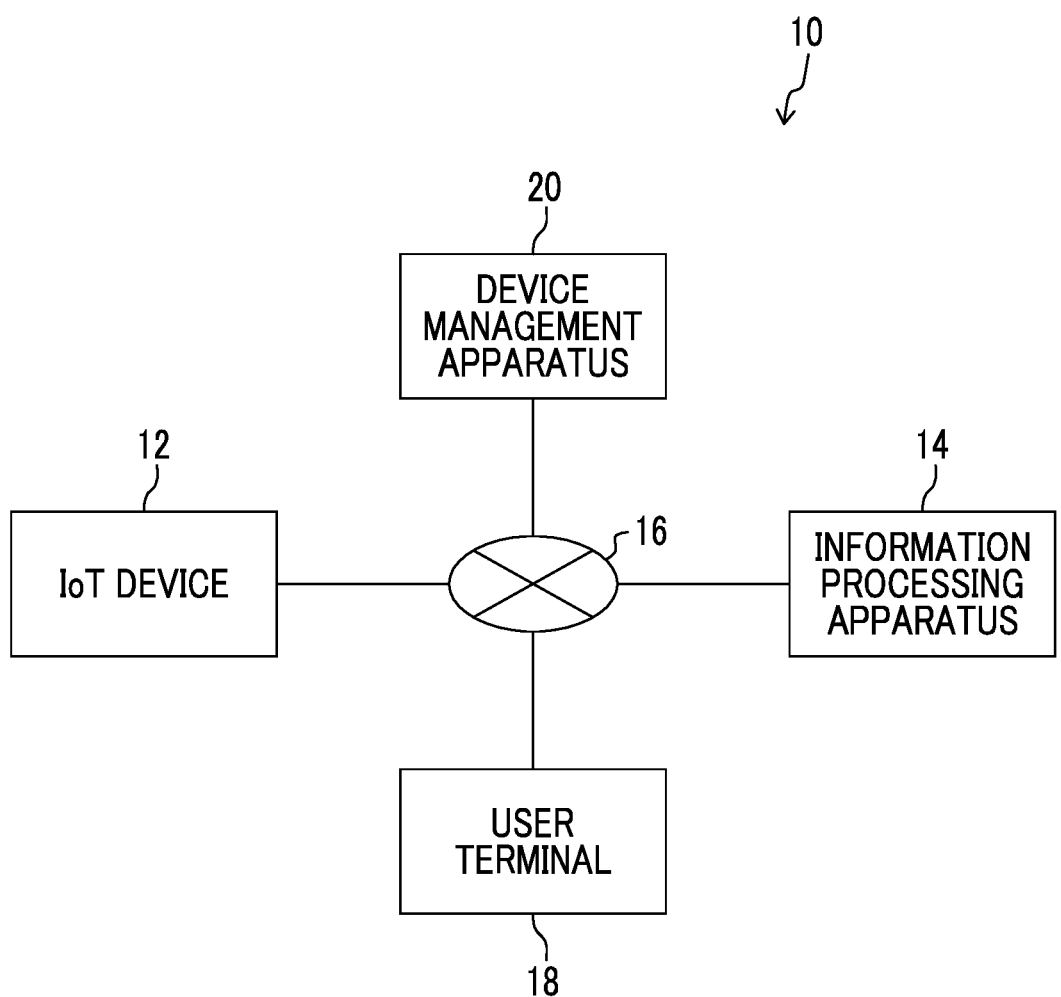
FIG. 1 is a schematic diagram showing a configuration of an information processing system according to an exemplary embodiment.

FIG. 1 is a schematic diagram showing a configuration of an information processing system 10 according to an exemplary embodiment. The information processing system 10 is configured with an IoT device 12 as one or more processing request transmission devices, and an information processing apparatus 14. The IoT device 12 and the information processing apparatus 14 are communicably connected to each other via a communication line 16 such as a LAN or the Internet. In addition, the information processing system 10 is configured with at least one of a user terminal 18 used by a user of the information processing apparatus 14 or a device management apparatus 20. The user terminal 18 and the device management apparatus 20 are also communicably connected to other apparatuses via the communication line 16.

The IoT device 12 is a device that transmits a job as a processing request causing the information processing apparatus 14 to execute processing to the information processing apparatus 14. Specifically, the IoT device 12 stores a device ID for uniquely identifying the IoT device 12 in a memory thereof, and transmits the job and the device ID thereof associated with the job to the information processing apparatus 14. The job may include target data that is a target of the job. For example, in a case where the job is a print job causing the information processing apparatus 14 to execute print processing, the target data is data (document data, image data, or the like) to be printed on a print medium. Of course, the target data may be various data (for example, voice data, moving image data, text data, and the like) depending on a type of the job.

The IoT device 12 does not transmit a user ID that uniquely identifies the user related to the job to the information processing apparatus 14. Therefore, the IoT device 12 may be usable while the user is not authenticated (in other words, the IoT device 12 does not specify the user).

The IoT device 12 may be any device as long as the job and the device ID can be transmitted to the information processing apparatus 14. For example, the IoT device 12 may be a device that transmits the job and the device ID without depending on an instruction from the user, in other words, autonomously. As the device, for example, an AI whiteboard, on which an AI is mounted and which autonomously transmits a job according to processing (for example, print processing or the like) related to content written by the user, is exemplified. Alternatively, an AI robot or the like, on which the AI is mounted and which inputs the job by autonomously operating the information processing apparatus 14, is exemplified. In addition, the IoT device 12 may be a device that transmits the job and the device ID depending on the instruction from the user, in other words, non-autonomously. However, as described above, even in this case, the IoT device 12 does not transmit the user ID to the information processing apparatus 14.

The information processing apparatus 14 is an apparatus that executes processing related to the received job. In particular, in a case where the job and the device ID are received from the IoT device 12, the information processing apparatus 14 according to the present exemplary embodiment specifies a related user who is the user related to the job based on the device ID and then executes processing according to the job. Although the information processing apparatus 14 is an image forming apparatus having functions of printing, copying, scanning, faxing, and saving an electronic document, the information processing apparatus 14 may be any apparatus as long as it is possible to specify the related user and then execute the processing according to the job. Details of the information processing apparatus 14 will be described later.

The user terminal 18 is, for example, a mobile terminal, such as a tablet terminal, a stationary personal computer, or the like. The user terminal 18 is configured to include a communication interface for communicating with the information processing apparatus 14 or the like, a memory configured with a hard disk, a Read Only Memory (ROM), a Random Access Memory (RAM), or the like, a display configured with a liquid crystal display or the like, an input interface configured with a mouse, a keyboard, a touch panel, or the like, and a processor configured with a Central Processing Unit (CPU), a microcomputer, or the like.

The device management apparatus 20 is an apparatus that performs management of the IoT device 12, in particular, management of a usage schedule of the IoT device 12. Specifically, in the device management apparatus 20, schedule information, in which a user related to each IoT device 12 is shown for each time zone, is managed. For example, in a case where the IoT device 12 is the AI whiteboard and is installed in a conference room, the device management apparatus 20 manages usage reservation information of the conference room. The usage reservation information includes information indicative of each conference execution time zone using the conference room, in which the IoT device 12 is installed, and participants of each conference. In this case, it is possible to estimate that one or more participants who participated in a certain conference are users related to the IoT device 12 in the conference execution time zone. Of course, as long as the user related to the IoT device 12 is managed for each time zone, any information may be managed in the device management apparatus 20.

Figure 2:
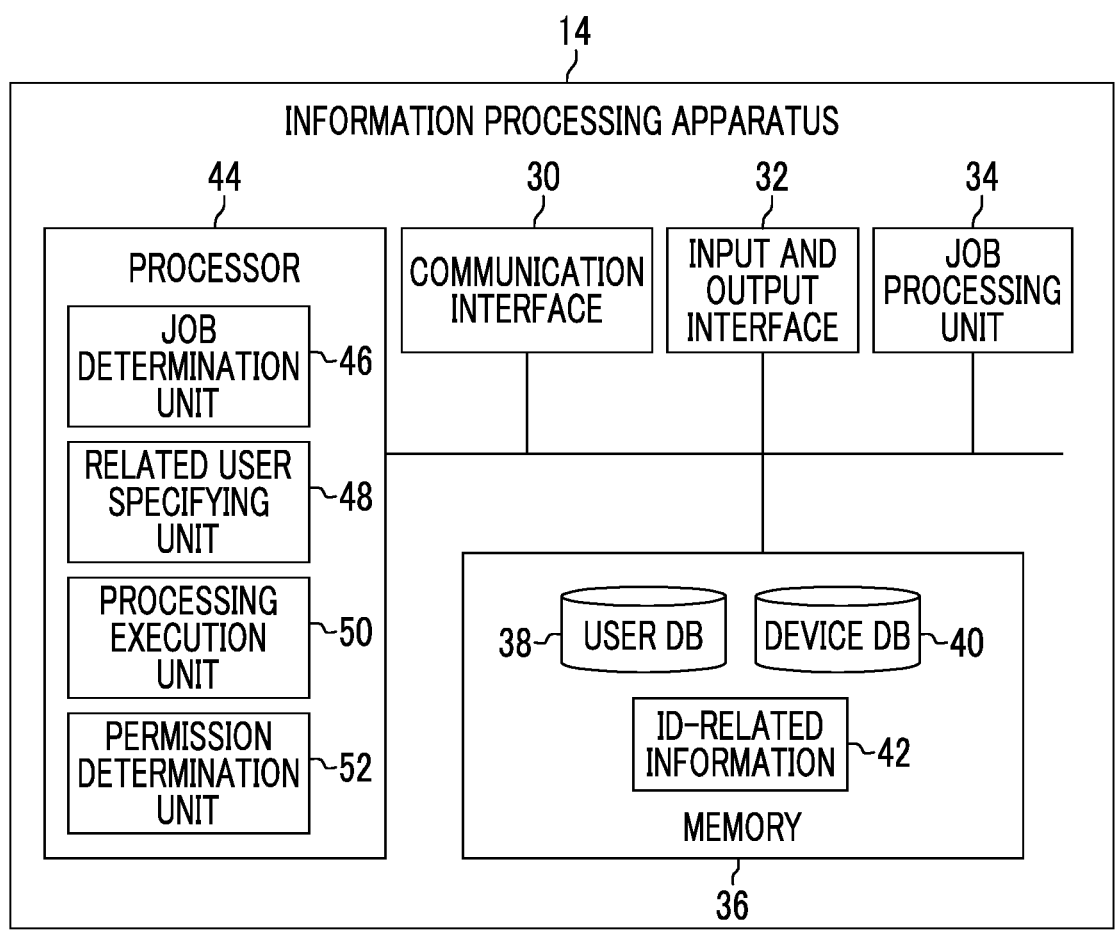
FIG. 2 is a schematic diagram showing a configuration of an information processing apparatus according to the present exemplary embodiment.

FIG. 2 is a schematic diagram showing a configuration of the information processing apparatus 14. Hereinafter, each unit of the information processing apparatus 14 will be described with reference to FIG. 2.

A communication interface 30 is configured to include, for example, a network adapter or the like. The communication interface 30 exhibits a function of communicating with another apparatus via the communication line 16. Specifically, the communication interface 30 receives the job and the device ID from the IoT device 12. In addition, the communication interface 30 transmits a notification (described later) to the user terminal 18. Further, the communication interface 30 accesses the device management apparatus 20 and acquires the schedule information managed by the device management apparatus 20.

An input and output interface 32 is configured to include, for example, an input interface, such as a touch panel or buttons, and an output interface such as the liquid crystal display or a speaker. The user can input various instructions to the information processing apparatus 14 using the input interface. In addition, in a case where the IoT device 12 is the AI robot or the like, the IoT device 12 can also input the job and the device ID using the input interface or can input an instruction with respect to the information processing apparatus 14. Various information related to the information processing apparatus 14 is output from the output interface.

A job processing unit 34 executes the job received by the information processing apparatus 14. For example, in a case where the information processing apparatus 14 is the image forming apparatus, the job processing unit 34 includes a printer configured with a paper feed mechanism, a photoconductor drum, a cartridge, or the like for performing print processing, an image scanner for performing scan processing of optically reading a document, which is a print medium, and generating image data, and the like. Of course, the job processing unit 34 can have various configurations depending on the jobs that can be processed by the information processing apparatus 14.

A memory 36 is configured to include, for example, a hard disk, a Solid State Drive (SSD), a ROM, a RAM, and the like. The memory 36 may be provided separately from a processor 44 which will be described later, or may include at least a part which is provided inside the processor 44. An information processing program for operating each unit of the information processing apparatus 14 is stored in the memory 36. In addition, as shown in FIG. 2, a user database (DB) 38, a device DB 40, and ID-related information 42 are stored in the memory 36.

The user DB 38 is a database that stores information related to the user of the information processing apparatus 14. In other words, it can be said that a person whose information is stored in the user DB 38 is the user of the information processing apparatus 14. User registration is performed on the information processing apparatus 14 by a manager of the information processing apparatus 14 or a person who wants to use the information processing apparatus 14, and various information, which is input when the user registration is performed, is stored in the user DB 38.

FIG. 3 is a diagram showing an example of content of the user DB 38. As shown in FIG. 3, information stored in the user DB 38 includes a user ID, authority information related to usage of the information processing apparatus 14 of the user, and contact information of the user.

The user ID is an identifier that uniquely identifies the user in the information processing apparatus 14. The user ID is assigned by the information processing apparatus 14 when the user registration is performed.

The authority information represents usage authority of the user related to the information processing apparatus 14. The authority information includes content of processing which can be instructed to the information processing apparatus 14 by the user, and a processable time zone that is a time zone in which the user can use the information processing apparatus 14. The usage authority of each user can be set when the user registration is performed. The example of FIG. 3 is an example of the user DB 38 in the case where the information processing apparatus 14 is the image forming apparatus having a print function. In the example of FIG. 3, print authority, tray authority, and the processable time zone are shown as the authority information. Of course, various different information may be stored in the user DB 38 as the authority information according to a type of the information processing apparatus 14 (in other words, a type of processing that can be executed by the information processing apparatus 14).

The print authority represents a type of the print processing which can be instructed to the information processing apparatus 14 by the user. As the type of the print processing, for example, color printing, single-sided printing, or the like is exemplified. In the example of FIG. 3, a user indicated by a user ID "U0001" is marked with "O" for both the color printing and the single-sided printing. This indicates that the user has an authority to instruct the information processing apparatus 14 to perform the color printing and the single-sided printing. On the other hand, a user indicated by a user ID "U0002" is marked with "X" for the color printing. This indicates that the user does not have the authority to instruct the information processing apparatus 14 to perform the color printing.

The tray authority represents a type of a paper tray which can be instructed by the user to be used with respect to the information processing apparatus 14. In a case where the image forming apparatus as the information processing apparatus 14 includes a plurality of paper trays, it is possible to set the usage authority of each paper tray (usually, different types of paper are set in respective paper trays) for each user. In particular, in the example of FIG. 3, as the tray authority, a special tray usage authority, in which special paper (for example, high-quality paper, thick paper, or the like) is set, is shown. In the example of FIG. 3, the user indicated by the user ID "U0001" is marked with "O" for the special tray. This indicates that the user has the special tray usage authority. On the other hand, the user indicated by the user ID "U0002" is marked with an "X" for the special tray. This indicates that the user does not have the special tray usage authority.

The processable time zone represents a time zone in which the user can use the information processing apparatus 14, in other words, a time zone in which the user can give an instruction for the processing according to the job to the information processing apparatus 14. In the information processing apparatus 14 according to the present exemplary embodiment, it is possible to set the time zone, in which the information processing apparatus 14 can be used, for each user, and a set time zone is shown in the processable time zone. In the example of FIG. 3, the user indicated by the user ID "U0001" is marked with "8:00 to 14:00" as the processable time zone. This indicates that the user can use the information processing apparatus 14 only from 8:00 to 14:00 every day.

The contact information includes, for example, information for identifying the user terminal 18 used by the user, an e-mail address of the user, or the like. The contact information can also be set when the user registration is performed. The contact information is referred to when a notification is provided from the information processing apparatus 14 to the user.

Of course, the information stored in the user DB 38 is not limited to the above content. For example, the user DB may include authentication information (for example, biometric information, a password, or the like) such that the user is authenticated by the information processing apparatus 14, or user's attribute information (a user name, a department, or the like).

Returning to FIG. 2, the device DB 40 is a database that stores a device ID for uniquely identifying the IoT device 12. The IoT device 12 is registered with respect to the information processing apparatus 14 by the manager or the like of the information processing apparatus 14, and the device ID of the IoT device 12, which is input in a case where the registration is performed, is stored in the device DB 40. The IoT device 12 indicated by the device ID stored in the device DB 40 is the IoT device 12 that is supposed to input the job (in other words, permitted to input the job) to the information processing apparatus 14. That is, the information processing apparatus 14 does not process the job from the IoT device 12 indicated by a device ID which is not registered in the device DB 40.

The ID-related information 42 is information in which the device ID stored in the device DB 40 is associated with the user ID stored in the user DB 38. The user indicated by the user ID associated with the device ID is a user related to the IoT device 12 indicated by the device ID. For example, a device ID indicating a certain IoT device 12 is associated with a user ID indicating a user who is an inventory manager of the IoT device 12. The ID-related information 42 is prepared in advance by the manager or the user of the information processing apparatus 14, and is stored in the memory 36.

FIG. 4 is a diagram showing an example of content of the ID-related information 42. In the example of FIG. 4, the user ID "U0002" is associated with a device ID "D0001". This indicates that the user indicated by the user ID "U0002" is a user related to the IoT device 12 indicated by the device ID "D001". Note that, in a case where there are a plurality of inventory managers for one IoT device 12, a plurality of user IDs may be associated with one device ID in the ID-related information 42. For example, a device ID "D0002" in the example of FIG. 4 is associated with the user ID "U0001" and a user ID "0004".

For example, as shown in FIG. 4, in the ID-related information 42, a set of the device ID and the user ID may be associated with execution permission information indicating whether or not a user indicated by the user ID is permitted, the execution permission information being related to execution of the job from the IoT device 12 indicated by the device ID. For example, a set of the device ID "D0001" and the user ID "U0002" is marked with the execution permission information "O". This indicates that execution of the job from the IoT device 12 indicated by the device ID "D0001" is permitted by the user indicated by the user ID "U0002" in advance. In addition, a set of the device ID "D0002" and the user ID "U0004" is marked with the execution permission information "X". This indicates that the execution of the job from the IoT device 12 indicated by the device ID "D0002" is not permitted by the user indicated by the user ID "U0004". A detailed description related to the permission of execution of the job by the user will be described later.

Returning to FIG. 2 again, in the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. As shown in FIG. 2, the processor 44 exhibits functions as a job determination unit 46, a related user specifying unit 48, a processing execution unit 50, and a permission determination unit 52 by the information processing program stored in the memory 36.

In a case where the information processing apparatus 14 receives the job, the job determination unit 46 determines whether or not the device ID associated with the job is also received. For example, in a case where the IoT device 12 transmits the job and the device ID to the information processing apparatus 14 via the communication line 16, the job determination unit 46 determines that the device ID related to the job is received, that is, the device ID is present. In addition, even when the IoT device 12, such as an AI robot, which is authenticated by the information processing apparatus 14 using the device ID, inputs the job from the input and output interface 32, the job determination unit 46 determines that the device ID related to the job is present. On the other hand, in a case where the user transmits the job (and the user ID) from the user terminal 18 to the information processing apparatus 14, or in a case where the user who is authenticated by the information processing apparatus 14 using the user ID inputs the job from the input and output interface 32, the job determination unit 46 determines that the device ID related to the job is not present.

Although processing, which is performed in a case where the job determination unit 46 determines that the device ID related to the received job is present, is as described later, the processor 44 causes the job processing unit 34 to specify the user based on the input user ID and then execute the processing of the job after as in the related art in a case where the job determination unit 46 determines that the device ID related to the received job is not present.

In a case where the job determination unit 46 determines that the device ID related to the received job is present, the related user specifying unit 48 specifies the related user related to the job based on the device ID. A related user specifying method includes methods as described below.

A first related user specifying method is a method of referring to the ID-related information 42. As described above, in the ID-related information 42, the user ID of the user related to the IoT device 12 indicated by the device ID is associated with each device ID. Therefore, the related user specifying unit 48 can specify the user indicated by the user ID associated with the received device ID as the related user based on the ID-related information 42.

A second related user specifying method is a method based on the schedule information managed by the device management apparatus 20 and a reception time of the job. As described above, in the schedule information managed by the device management apparatus 20, the users related to each IoT device 12 are shown for each time zone. Therefore, at the reception time of the job, it is possible to specify the user related to the IoT device 12 indicated by the device ID related to the job as the related user.

A specific example will be described with reference to FIG. 5. FIG. 5 is a diagram showing an example of content of the schedule information managed by the device management apparatus 20. The schedule information shown in FIG. 5 is conference room usage reservation information indicating a usage reservation situation of each conference room in a case where the IoT device 12 is the AI whiteboard and each IoT device 12 is installed in each conference room. The example of FIG. 5 shows that, for example, the IoT device 12 (here, the AI whiteboard) indicated by the device ID "D0001" is installed in a conference room "Room1", and that a conference in which the users represented by the user IDs "U0001" and "U0004" participate is held in the time zone until "13:00 to 14:00" in the conference room "Room1".

Here, it is assumed that the information processing apparatus 14 receives the job and the device ID "D0001" from the IoT device 12, and the reception time of the job and the device ID is 13:57. In this case, the related user specifying unit 48 specifies a conference room according to the device ID "D0001" received from the schedule information. Here, the conference room "Room1" associated with the device ID "D0001" is specified in the schedule information. Next, the related user specifying unit 48 specifies the conference that is being held at the job reception time in the specified conference room "Room1", and participants thereof. Here, since the job reception time is 13:57, the conference held in the time zone from "13:00 to 14:00" and the users who are participants of the conference and are indicated by user IDs "U0001" and "U0004" are specified. The users specified in as above are the related users related to the job. The related user specifying unit 48 may set all the participants of the specified conference as the related users, or may set only some of the participants of the specified conference (for example, a representative such as a chairman) as the related users. As will be described later, there is a case where a notification is provided to the specified related users by the information processing apparatus 14, and there is an effect of suppressing transmission of the notification to a large number of related users by limiting the number of related users to a small number.

In the schedule information managed by the device management apparatus 20, a case may be conceivable in which a person other than the user of the information processing apparatus 14, that is, the user registered in the user DB 38 of the information processing apparatus 14 (hereinafter, referred to as "non-user") is managed as a person related to the IoT device 12. However, since the information processing apparatus 14 executes only the job related to the user registered in the user DB 38, the related user specifying unit 48 specifies the related user by excluding the non-user. That is, the non-user is not specified as the related user.

In the example of FIG. 5, the participant of each conference in the schedule information is indicated by the user ID of the information processing apparatus 14. However, since the information processing apparatus 14 and the device management apparatus 20 are separate apparatuses, there is a case where, in the schedule information, the user related to the IoT device 12 in each time zone is managed by an identifier other than the user ID of the information processing apparatus 14. In the case, the related user specifying unit 48 specifies the user ID of the information processing apparatus 14 corresponding to the user identifier managed by the device management apparatus 20 based on information indicating the relationship between the user ID of the information processing apparatus 14 and the user identifier managed by the device management apparatus 20 (for example, a user management system or the like in a company in which the information processing apparatus 14 and the device management apparatus 20 are installed).

A third related user specifying method is a method based on target data that is a target of the job. As described above, there is a case where the job includes the target data that is the target to be processed. In the case, the related user specifying unit 48 can specify the related user based on information obtained by analyzing the target data that is the target of the job.

For example, when the target data is the image data, the related user specifying unit 48 can specify the related user based on the information extracted from the image data. Specifically, in a case where the information processing apparatus 14 is used in a company in charge of construction, the target data is a construction site image obtained by capturing a construction site, and a bridge is captured in the construction site image, it is possible to specify a person in charge of a river section of the construction company as the related user. In addition, in a case where a traffic light is captured in the construction site image, it is possible to specify a person in charge of road maintenance section of the construction company as the related user. In addition, in a case where a water pipe is captured in the construction site image, it is possible to specify a person in charge of a water supply section of the construction company as the related user. It is possible to obtain the person in charge of each section of the construction company from an in-house system.

In addition, in a case where the target data is a document file (for example, an estimate, a purchase order, or the like), a creator or the like of the document file, who is written in the document file or extracted from metadata (attribute data) of the document file, may be specified as the related user.

Of course, since the target data is not limited to the above example, the related user specifying unit 48 can specify the related user based on various information obtained by analyzing various target data.

In the present exemplary embodiment, the related user specifying unit 48 specifies the related user related to the job by using the above-mentioned first to third specifying methods at a timing of receiving the job having the device ID. However, the timing of specifying the related user related to the job is not limited thereto. The related users may be specified at least until the job is executed.

A fourth related user specifying method is a method in which the user authenticated by the information processing apparatus 14 (the user becomes the related user) selects the job associated with the device ID held in the information processing apparatus 14. First, in a case where the processor 44 receives the job and the device ID from the IoT device 12, the processor 44 associates the job with the device ID and stores the job and the device ID in the memory 36. In this state, in a case where the user logs into the information processing apparatus 14 (that is, in a case where the information processing apparatus 14 authenticates the user), the related user specifying unit 48 specifies the job associated with the device ID (more specifically, the user ID is not associated) from the memory 36, and notifies a list of specified jobs to the user. For example, the list of the jobs is displayed on the liquid crystal display of the input and output interface 32. The notification of the list of the jobs may be performed in a case where there is a request from the user (for example, in a case where a specific button displayed on the liquid crystal display is operated). In a case where any of the jobs is selected by the user, the related user specifying unit 48 specifies the user identified by authentication processing as the related user of the selected job.

In addition, in order to suppress the notification of the list of the jobs to an unspecified number of users, the related user specifying unit 48 may notify only a job satisfying a predetermined condition to the user who logs into the information processing apparatus 14. More specifically, the related user specifying unit 48 may notify only a job corresponding to the user who logs into the information processing apparatus 14 to the user. For example, the IoT device 12 may transmit a password to the information processing apparatus 14, together with the job and the device ID, and the related user specifying unit 48 may notify only a job corresponding to the password input to the information processing apparatus 14 by the user who logs into the information processing apparatus 14 to the user. Alternatively, the related user specifying unit 48 may notify only a job associated with the device ID corresponding to the user ID of the user who logs into the information processing apparatus 14 in the ID-related information 42 to the user.

In the fourth specifying method, the related user specifying unit 48 notifies the jobs associated with the device ID among the received jobs to the user, and, in a case where the user selects any job from among the notified jobs, specifies that the related user of the job is the user. Therefore, it can be mentioned that, in the fourth specifying method, the related user specifying unit 48 specifies the related user related to the job based on the device ID. In addition, a timing at which the fourth specifying method is performed may be included at least until the job is executed.

In the present specification, as described above, four specifying methods are described as a method of specifying the related user related to the job. However, the related user specifying unit 48 may specify the related user using other methods.

In a case where the related user specifying unit 48 specifies the related user related to the job received by the information processing apparatus 14, the processing execution unit 50 executes the processing according to the job. In other words, in a case where it is not possible to specify the related user related to the job, the processing execution unit 50 does not execute the processing according to the job. By doing so, even in a case where the job is received from the IoT device 12 whose device ID is registered in the device DB 40, it is possible to refuse to execute the job in a case where the job is a job that is not related to the user of the information processing apparatus 14 at all. As a result, each user can use the information processing apparatus 14 more safely. In addition, in a case where the related user is specified, the processing execution unit 50 can perform processing according to the specified related user. For example, in a case where the job received from the IoT device 12 is a job for storing the target data in a storage area (for example, a folder) dedicated to the related user, the related user is specified, so that it is possible to specify the storage area of a storage destination of the target data and it is possible to store the target data in the specified storage area. As a result, each user does not need to specify the storage area of the storage destination of the target data. That is, convenience of the information processing apparatus 14 of each user is improved.

In addition, a case is considered where an upper limit of the number of printing sheets within a predetermined period is set for each user according to company regulations or the like, the job received by the information processing apparatus 14 is a print job of printing a plurality of sheets, and a plurality of related users related to the job are specified. In this case, it is unfair in a case where all the number of processing sheets related to the job is subtracted from a share of the number of printing sheets possessed by one related user. Therefore, the processing execution unit 50 may subtract the number of processing sheets from the share of the number of printing sheets of each of the plurality of related users. As a method of subtracting the number of processing sheets from the share of the number of printing sheets of each related user, the number of processing sheets may be subtracted evenly from the share of the number of printing sheets of each related user, or the number of processing sheets may be subtracted at a ratio according to a remaining share of each related user.

The permission determination unit 52 determines whether or not permission related to execution of the processing according to the job (hereinafter, abbreviated as "permission from the related user") is obtained from the related user specified by the related user specifying unit 48. The processing execution unit 50 executes the processing according to the job when the permission is obtained from the related user. In addition, the processing execution unit 50 can stop the execution of the processing according to the job in a case where the permission is not obtained from the related user. A method of determining whether or not the permission from the related user is present includes a method as described below.

The first method of determining whether or not the permission from the related user is present is a method of providing a notification to the related user. Specifically, the permission determination unit 52 outputs a notification for obtaining permission for executing the processing according to the job to the related user specified by the related user specifying unit 48. Specifically, the permission determination unit 52 refers to the user DB 38, specifies the contact information of the specified related user, and outputs the notification to the specified contact information. For example, the permission determination unit 52 displays "Yes" and "No" buttons, together with a text string "A job is received from a device ID "Uxxxxx". Do you permit execution of processing according to the job?", on a display of the user terminal 18 used by the related user. Needless to say, in a case where the related user presses the "Yes" button, a permission signal is transmitted from the user terminal 18 to the information processing apparatus 14, and the permission determination unit 52 receives the permission signal and determines that the permission is obtained from the related user related to the job. In a case where the related user presses the "No" button, a refusal signal is transmitted from the user terminal 18 to the information processing apparatus 14, and the permission determination unit 52 receives the refusal signal and determines that the permission is not obtained from the related user related to the job.

When a plurality of related users are specified for one job, the permission determination unit 52 can output a notification to the plurality of related users. In this case, a case is conceivable in which presence or absence of the permission from each related user is differ from each other. In preparation for the case, the manager of the information processing apparatus 14 may set a determination reference of the permission determination unit 52 in advance. For example, the determination reference may be set in which, in a case where permission is obtained from a predetermined ratio (1 to 100%) in the plurality of related users, it is determined that permission for executing the processing according to the job is obtained.

A different determination reference may be provided for each device ID (that is, for each IoT device 12). For example, there is a case where a degree of secrecy (security level) of target data of a print job transmitted from the first AI whiteboard installed in a conference room that is not accessible to outsiders is higher than a degree of secrecy of target data of a print job transmitted from the second AI whiteboard installed in a conference room that is used for conference with outsiders. In the case, the determination reference of the first AI whiteboard can be set to be stricter than the determination reference of the second AI whiteboard so that a printed matter having a high degree of secrecy is not easily output. For example, it is possible to assume that the determination reference of the first AI whiteboard is that the permission is obtained from all of the plurality of related users, and the determination reference of the second AI whiteboard is that the permission is obtained from any one of the plurality of related users. The determination reference can be stored in the device DB 40 in association with the device ID.

The permission determination unit 52 may output a notification to the related user who can give the instruction for the processing according to the job based on the authority information of each user, which is stored in the user DB 38. For example, a case is considered where the content of the user DB 38 is the content shown in FIG. 3, a print job received from a certain IoT device 12 at a time of 13:00 is to instruct color printing, and the user indicated by the user ID "U0001" and the user indicated by the user ID "U0002" are specified as the related users of the print job. In this case, the permission determination unit 52 refers to the authority information of the user DB 38, and determines that the user indicated by the user ID "U0001" can instruct the color printing, that is, can give the instruction for the processing according to the print job, and, on the other hand, the user indicated by the user ID "U0002" cannot instruct the color printing, that is, cannot give the instruction for the processing according to the print job. Therefore, the permission determination unit 52 does not output the notification to the user indicated by the user ID "U0002", and outputs the notification only to the user indicated by the user ID "U0001".

In addition, a case is considered where the content of the user DB 38 is the content shown in FIG. 3, a job received from a certain IoT device 12 at a time of 15:00, and the user indicated by the user ID "U0001" and the user indicated by the user ID "U0002" are specified as the related users of the job. In this case, the permission determination unit 52 refers to the authority information of the user DB 38, and determines that the user indicated by the user ID "U0001" cannot instruct the processing according to the reception time of the job and the user indicated by the user ID "U0002" can instruct the processing according to the job at the reception time of the job. Therefore, the permission determination unit 52 does not output the notification to the user indicated by the user ID "U0001", and outputs the notification only to the user indicated by the user ID "U0002".

In addition, a case is conceivable where the related user specified by the related user specifying unit 48 (all the related users in a case where the plurality of related users are specified) cannot instruct the processing according to the job due to the usage authority for the information processing apparatus 14 of the related users. In this case, since there is no notification output target by the permission determination unit 52, the processing execution unit 50 may stop the job without executing the job. The processing execution unit 50 may modify and execute the job according to processing that can be instructed by the related user after obtaining permission of the related user specified by the permission determination unit 52.

For example, a case is considered where the content of the user DB 38 is the content shown in FIG. 3, a print job received from a certain IoT device 12 at a time of 13:00 is to instruct color printing, and the user indicated by the user ID "U0002" is specified as the related user of the print job. In this case, since the related user cannot instruct the color printing, there is no notification output target by the permission determination unit 52. In this case, the permission determination unit 52 checks, with respect to the user indicated by the user ID "U0002", whether or not the print job may be executed as a job of black-and-white printing that can be instructed by the user. Thereafter, in a case where the user performs permission, the processing execution unit 50 may execute the print job by performing the black-and-white printing.

In addition, as a modification example of the job, in a case where the print job is to instruct single-sided printing and the specified related user cannot instruct the single-sided printing, the processing execution unit 50 can execute the print job as a double-sided printing job after the permission determination unit 52 obtains permission of the related user. In addition, in a case where the print job is to instruct the use of the special tray and the specified related user cannot instruct the use of the special tray, the processing execution unit 50 can execute the print job as a job to use a normal tray after the permission determination unit 52 obtains the permission of the related user.

In addition, even in a case where the reception time of the job is a time which is not included in a processable time zone of the specified related user, it is assumed that, originally, the notification output target by the permission determination unit 52 is not included. However, in this case, the permission determination unit 52 outputs a notification to obtain permission according to execution of the processing according to the job from the related user, and, in a case where the permission is obtained from the related user, the processing execution unit 50 may wait until the time included in the processable time zone of the related user and may execute the job. In a case where the plurality of related users are specified and the reception time of the job is the time that is not included in the processable time zone of any of the related users, the permission determination unit 52 outputs a notification to a related user having the temporally closest processable time zone from the reception time of the job, and, in a case where the permission is obtained from the related user, the processing execution unit 50 may wait until the time included in the processable time zone of the related user and may execute the job.

A second method of determining whether or not the permission from the related user is present is a method of referring to the ID-related information 42. As described above, there is a case where, in the ID-related information 42, the execution permission information is associated with the set of the device ID and the user ID. In the case, the permission determination unit 52 can determine whether or not the permission from the related user is present based on the ID-related information 42.

For example, a case is considered where the ID-related information 42 includes the content shown in FIG. 4, the job from the IoT device 12 indicated by the device ID "D0001" is received, and the user indicated by the user ID "U0002" is specified as the related user of the job. In this case, the permission determination unit 52 refers to the ID-related information 42, and determines that the permission from the related user related to the job is obtained based on the execution permission information "O" associated with the device ID "D0001" and the user ID "U0002". In addition, a case is considered where the ID-related information 42 includes the content shown in FIG. 4, and the job from the IoT device 12 indicated by the device ID "D0004" is received, and the user indicated by the user ID "U0423" is specified as the related user of the job. In this case, the permission determination unit 52 refers to the ID-related information 42, and determines that the permission from the related user related to the job is not obtained based on the execution permission information "X" associated with the device ID "D0004" and the user ID "U0423".

In a case where the plurality of related users are specified with respect to one job input from one IoT device 12, a case is conceivable that the execution permission information of each related user in the ID-related information 42 is different from each other. For example, in the example of FIG. 4, although the execution permission information is "O" with respect to the set of the device ID "D0002" and the user ID "U0001", the execution permission information is "X" with respect to the same set of the device ID "D0002" and the user ID "U0004". Further, there is a case where, with respect to the job received from the device ID "D0002", the user indicated by the user ID "U0001" and the user indicated by the user ID "U0004" are specified as the related users. In preparation for the case, the manager of the information processing apparatus 14 may set the determination reference of the permission determination unit 52 in advance, as the same as in the first determination method. For example, the determination reference may be set in which, in a case where permission is obtained from a predetermined ratio (1 to 100%) in the plurality of related users, it is determined that permission for executing the processing according to the job is obtained.

In the present specification, as described above, two determination methods are described as the method of determining whether or not the permission from the related user is present. However, the permission determination unit 52 may determines whether or not the permission from the related user is present by using other methods.

Figure 6:
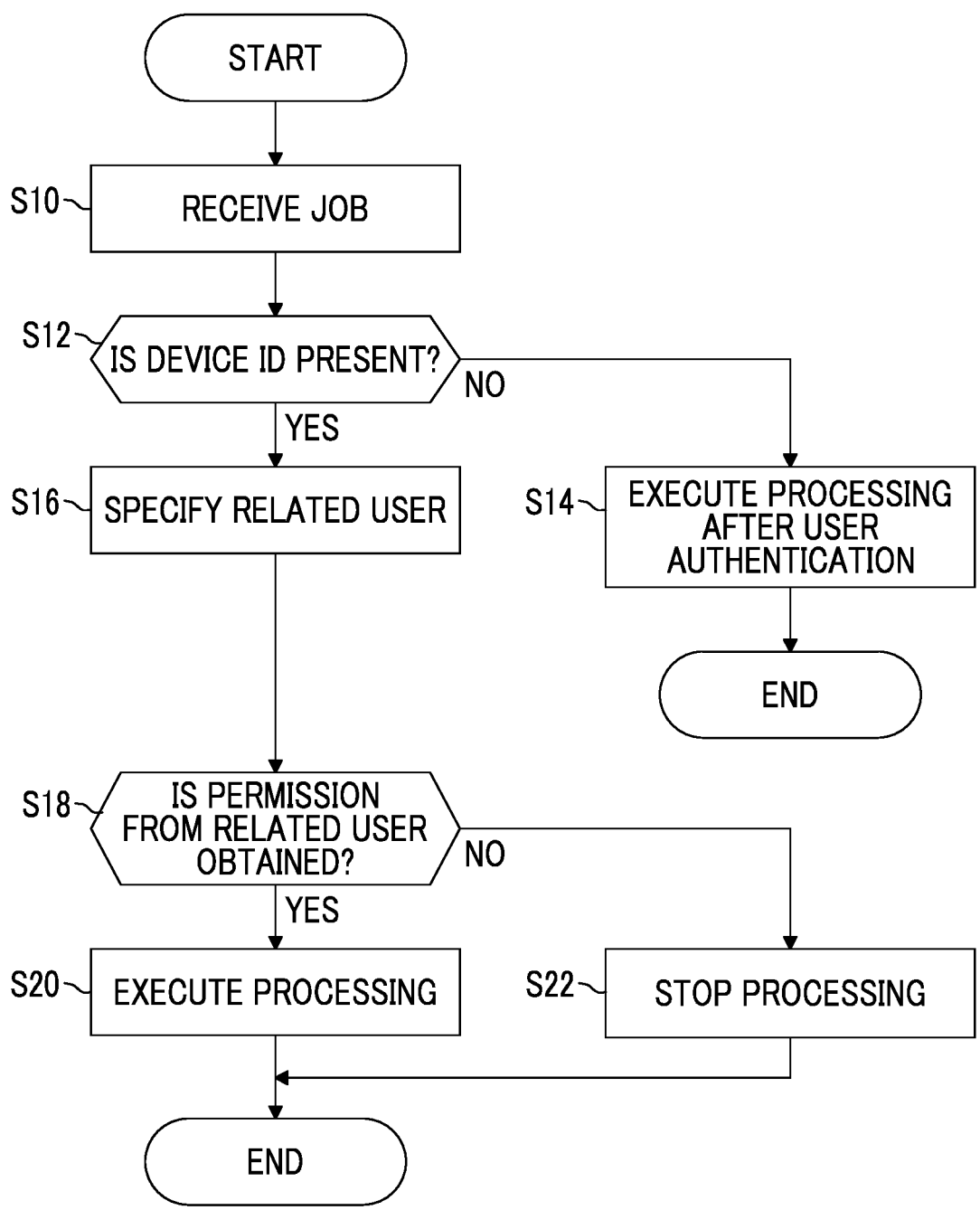
FIG. 6 is a flowchart showing a flow of processing of the information processing apparatus according to the present exemplary embodiment.

An outline of the information processing apparatus 14 according to the present exemplary embodiment is as described above. Hereinafter, a flow of the processing of the information processing apparatus 14 will be described with reference to a flowchart shown in FIG. 6.

In step S10, the information processing apparatus 14 receives a job.

In step S12, the job determination unit 46 determines whether or not there is a device ID associated with the job received in step S10. In a case where there is no device ID, the process proceeds to step S14, the processor 44 authenticates the user, the processing execution unit 50 specifies the user by user authentication and then executes the processing according to the job received in step S10. In a case where there is the device ID, the process proceeds to step S16.

In step S16, the related user specifying unit 48 specifies the related user related to the job received in step S10. Since the related user specifying method is as described above, detailed description thereof will not be repeated.

In step S18, the permission determination unit 52 determines whether or not permission related to execution of the job received in step S10 is obtained from the related user specified in step S16. Since the method of determining whether or not the permission from the related user is present is as described above, detailed description thereof will not be repeated here.

In a case where the permission is obtained from the related user, in step S20, the processing execution unit 50 executes the processing according to the job received in step S10.

In a case where the permission from the related user is not obtained, in step S22, the processing execution unit 50 stops the processing according to the job received in step S10 without executing the processing.

Although the exemplary embodiments according to the present invention have been described above, the present invention is not limited to the above exemplary embodiments, and various modifications can be made without departing from the gist of the present invention.

For example, the function exhibited by the information processing apparatus 14 according to the present exemplary embodiment may be exhibited by cooperation of a plurality of apparatuses instead of one apparatus. In this case, an assembly of the plurality of apparatuses corresponds to the information processing apparatus 14. In addition, in the present exemplary embodiment, the user DB 38, the device DB 40, and the ID-related information 42 are stored in the memory 36 of the information processing apparatus 14, but the user DB 38, the device DB 40, and the ID-related information 42 may be stored in another apparatus capable of communicating with the information processing apparatus 14.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a storage device, and
   a processor coupled to the storage device and configured to
   receive a device identification (ID) for identifying a processing request transmission device and a processing request from the processing request transmission device;
   specify a plurality of related users comprising a first related user and a second related user related to the processing request based on the device ID and then execute processing according to the processing request; and
   further specify the plurality of users related to the processing request transmission device at a reception time of the processing request as the plurality of related users based on schedule information in which the reception time of the processing request is within a time zone scheduled for the related user to be allowed to use the information processing apparatus, wherein the device ID is associated with the first related user and the second related user based on a ID related information stored in the storage device, the first related user is indicated as being permitted to execute the processing request and the second related user is indicated as not being permitted to execute the processing request;
   execute a job associated with the processing request in a device having the device ID by the first related user as long as the first related user is permitted to execute the processing request, and
   stop executing the job associated with the processing request in the device having the device ID by the second related user as long as the second related user is not permitted to execute the processing request.

2. The information processing apparatus according to claim 1, wherein the processor is further configured to
   execute the processing according to the processing request in a case where permission is obtained from multiple related users of the plurality of related users.

3. The information processing apparatus according to claim 2, wherein the processor is configured to
   output a notification for obtaining permission related to the execution of the processing request to the multiple related users.

4. The information processing apparatus according to claim 3, wherein the processor is configured to output the notification to the plurality of related users who are capable of giving an instruction for the processing according to the processing request based on usage authority related to the information processing apparatus.

5. The information processing apparatus according to claim 3, wherein the processor is further configured to:
   determine whether to execute the processing request based on a return confirmation corresponding to the notification from each of the multiple related users, and the return confirmation exceeds a predetermined ratio between a first number of related to users willing to execute the processing request and a second number of related users not willing to execute the processing request.

6. The information processing apparatus according to claim 1,
   wherein the processor is configured to
   specify a user indicated by a user ID associated with the received device ID as one of the plurality of related users based on ID-related information in which the device ID is associated with the user ID indicating a user related to the processing request transmission device indicated by the device ID.

7. The information processing apparatus according to claim 6, wherein in the ID-related information, a set of the device ID and at least one user ID is associated with information indicating whether or not the permission of the user indicated by the at least one user ID is present, the permission being related to the execution of the processing request from the processing request transmission device indicated by the at least one device ID, and the processor is configured to determine whether or not the permission from at least one of the plurality of related users related to the execution of the processing request is present with reference to the ID-related information.

8. The information processing apparatus according to claim 1, wherein the processor is configured to specify the plurality of related users based on information obtained by analyzing target data that is a target of the processing request.

9. The information processing apparatus according to claim 1, wherein each of the plurality of related users are associated with an authority to a first function and an authority to a second function of the information processing apparatus.

10. The information processing apparatus according to claim 9, wherein the first function is related to a printing function of the information processing apparatus and the second function is related to a tray selection function of the information processing apparatus.

11. A non-transitory computer readable medium storing an information processing program in a storage device of the computer causing the computer to execute a process, the process comprising:

receiving a device identification (ID) for identifying a processing request transmission device and a processing request from the processing request transmission device;

specifying a plurality of related users comprising a first related user and a second related user related to the processing request based on the device ID and then executing processing according to the processing request; and further specifying the plurality of users related to the processing request transmission device at a reception time of the processing request as the plurality of related users based on schedule information in which the reception time of the processing request is within a time zone scheduled for the related user to be allowed to use the information processing program, wherein the device ID is associated with the first related user and the second related user based on a ID related information stored in the storage device of the computer, the first related user is indicated as being permitted to execute the processing request and the second related user is indicated as not being permitted to execute the processing request;

executing a job associated with the processing request in a device having the device ID by the first related user as long as the first related user is permitted to execute the processing request, and stop executing the job associated with the processing request in the device having the device ID by the second related user as long as the second related user is not permitted to execute the processing request.

12. An information processing apparatus comprising:

means for storing information;

means for receiving a device identification (ID) for identifying a processing request transmission device and a processing request from the processing request transmission device;

means for specifying a plurality of related users comprising a first related user and a second related user related to the processing request based on the device ID and then executing processing according to the processing request; and means for further specifying the plurality of users related to the processing request transmission device at a reception time of the processing request as the plurality of related users based on schedule information in which the reception time of the processing request is within a time zone scheduled for the related user to be allowed to use the information processing apparatus, wherein the device ID is associated with the first related user and the second related user based on a ID related information stored in the storage device, the first related user is indicated as being permitted to execute the processing request and the second related user is indicated as not being permitted to execute the processing request;

means for executing a job associated with the processing request in a device having the device ID by the first related user as long as the first related user is permitted to execute the processing request, and means for stop executing the job associated with the processing request in the device having the device ID by the second related user as long as the second related user is not permitted to execute the processing request.

\* \* \* \* \*